United States Patent [19]

Watabe

[11] Patent Number: 5,001,659

[45] Date of Patent: Mar. 19, 1991

[54] STRUCTURE FOR CONNECTING A ROTATABLE BODY TO A STATIONARY BODY

[75] Inventor: Noboru Watabe, Tokyo, Japan

[73] Assignee: NEC Corporation, Japan

[21] Appl. No.: 448,687

[22] Filed: Dec. 11, 1989

[30] Foreign Application Priority Data

Dec. 12, 1988 [JP] Japan ................................. 63-314108

[51] Int. Cl.⁵ ............................................. G06F 1/00
[52] U.S. Cl. ................................................. 364/708
[58] Field of Search ................ 364/108; 439/164, 165; 340/711

[56] References Cited

U.S. PATENT DOCUMENTS

| | | | |
|---|---|---|---|
| 4,667,299 | 5/1987 | Dunn | 1/709 |
| 4,730,364 | 3/1988 | Tat-Kee | 364/708 X |
| 4,852,033 | 7/1989 | Saitou | 364/708 |
| 4,864,523 | 9/1989 | Sasaki | 364/708 |

FOREIGN PATENT DOCUMENTS 60-225920 11/1985 Japan ................................... 364/708

Primary Examiner—Dale M. Shaw
Assistant Examiner—Tan V. Mai
Attorney, Agent, or Firm—Laff Whitesel Conte & Saret

[57] ABSTRACT

A structure for connecting a cover of a portable lap-top personal computer, word processor or similar equipment having a display rotatably to a case which accommodates a body of the computer or word processor. The case and cover are electrically interconnected at coactive hinge portions thereof by a pair of deformed O-rings and a pair of flat O-rings which are implemented by conductive resilient members and are held in slidable contact with each other.

7 Claims, 5 Drawing Sheets

Fig. 1
Fig. 2
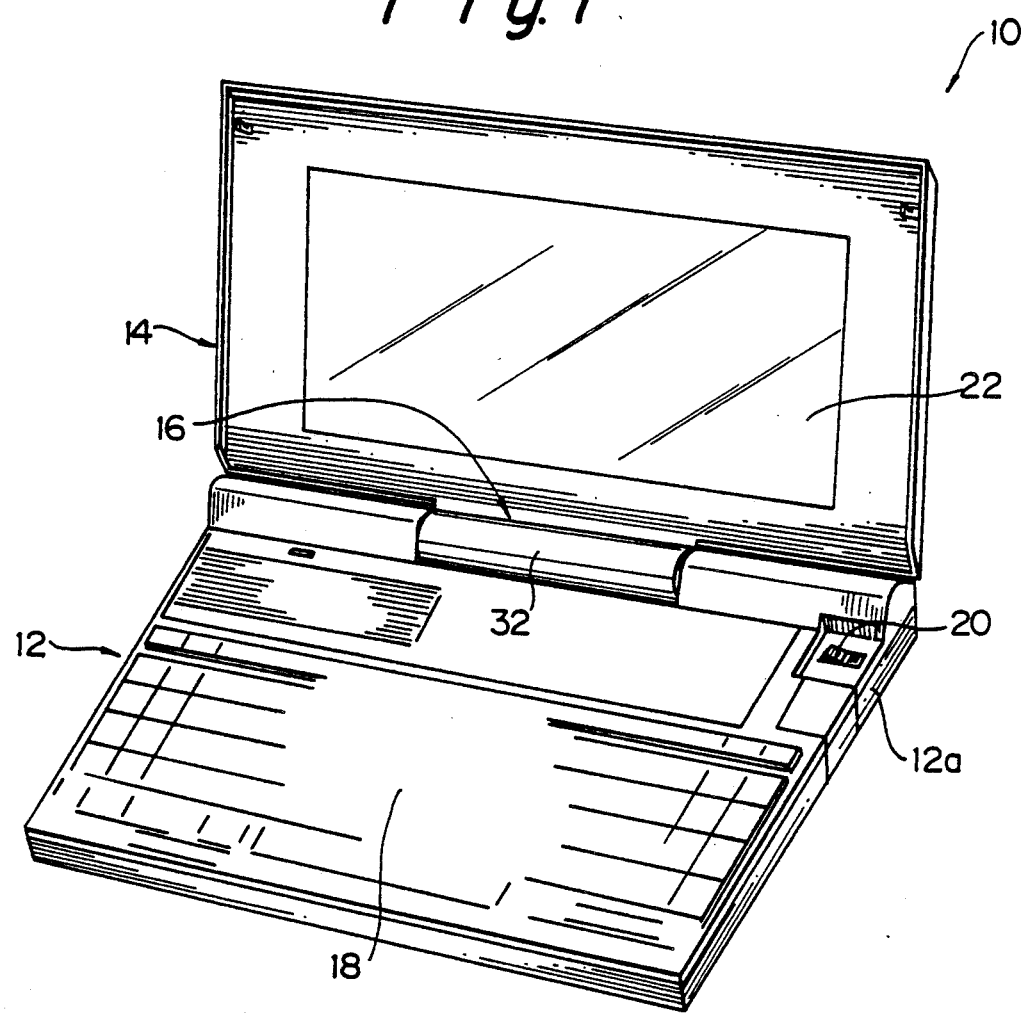
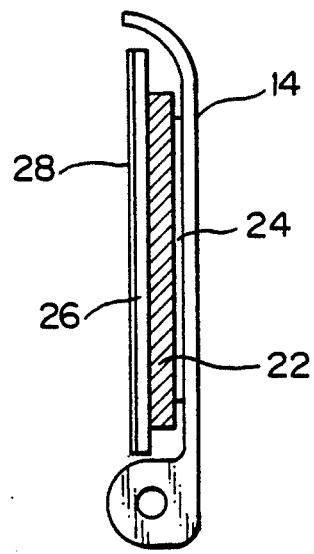

STRUCTURE FOR CONNECTING A ROTATABLE BODY TO A STATIONARY BODY

BACKGROUND OF THE INVENTION

The present invention relates to a structure for connecting a rotary body to a stationary body and, more particularly, to a structure for connecting a cover of portable equipment rotatably to a case which accommodates a body of the equipment.

Some modern personal computers, word processors or similar office equipment have extremely small size and light weight for portability purpose and are even manipulable on the user's lap. A lap-top personal computer or word processor, for example, is generally made up of a case accommodating a body of such equipment thereinside and loaded with a keyboard, and a cover loaded with a liquid crystal display or similar display. The cover is rotatably connected to the case, i.e., it covers the keyboard and display for protection when closed and uncovers them for operation when opened. This kind of portable personal computer is disclosed in U.S. Pat. No. 4,571,456 (Paulsen et al), for example. In such prior art equipment, the surfaces of the cover and case are coated with a conductive material in order to prevent electromagnetic waves issuing from the body built in the case from being radiated to the outside and thereby effecting other electronic equipment which may exist therearound. This implementation against the radiation, i.e., the shield against electromagnetic waves does not work sufficiently if the base and the cover, especially their conductive coating, are different in potential. A prerequisite is, therefore, that the cover be electrically connected to the case efficiency and, yet, by the shortest possible path to have the same potential as the case while being physically rotatably connected to the case.

SUMMARY OF THE INVENTION

It is therefore an object of the present invention to provide a structure which connects a rotatable body rotatably to a stationary body while electrically connecting them by the shortest possible path to maintain them at the same potential.

It is another object of the present invention to provide a structure which allows a rotatable body to be rotatably connected to a stationary body by efficient assembly.

It is another object of the present invention to provide a structure which enhances the durability of members which interconnect a rotatable body and a stationary body and, yet, enhances reliable electrical connection.

It is another object of the present invention to provide a structure for connecting a cover of a portable personal computer, word processor or similar equipment having a display rotatably to a case of the equipment while facilitating the assembly of the cover and case, and setting up electrical connection between the cover and case by the shortest possible path to maintain them at the same potential and thereby to enhance the reliability of electrical connection while increasing the durability of electrical connecting members.

It is another object of the present invention to provide a generally improved structure for connecting a rotatable body to a stationay body.

A structure for connecting a rotatable body rotatably to a stationary body while maintaining electrical connection of the rotatable body and stationary body of the present invention comprises a pair of coupling members constituting a hinge portion of the rotatable body and each having an engaging end, a through hole formed at the center of the engaging end, and a plurality of lugs provided in a peripheral portion of the engaging end, a pair of deformed O-rings each having a through hole aligning with the through hole of associated one of the coupling members at the center, and each having a bent portion and apertures in a peripheral portion, the apertures each mating with respective one of the lugs, a pair of support members constituting a hinge portion of the stationary body and each having an engaging end, a through hole formed through the center of the engaging end, and a plurality of channels formed in a peripheral portion of the engaging end, a pair of flat O-rings each having a through hole aligning with the through hole of associated one of the support members at the center, and a plurality of lugs each mating with respective one of the channels of the associated support member, and a pair of shaft members each being passed through the through hole of associated one of the coupling members, the through hole of associated one of the deformed O-rings, the through hole of associated one of the flat O-rings, and the through hole of associated one of the support members, whereby each of the bent portions of the deformed O-rings mounted on the engaging ends of the support members is held in slidable contact with the peripheral portion of respective one of the flat O-rings.

BRIEF DESCRIPTION OF THE DRAWINGS

The above and other objects, features and advantages of the present invention will become more apparent from the following detailed description taken with the accompanying drawings in which:

FIG. 1 is a perspective view of a portable lap-top personal computer to which the present invention is applied;

FIG. 2 is a sectional side elevation showing a cover of the computer of FIG. 1;

DESCRIPTION OF THE PREFERRED EMBODIMENT

Figure 3:
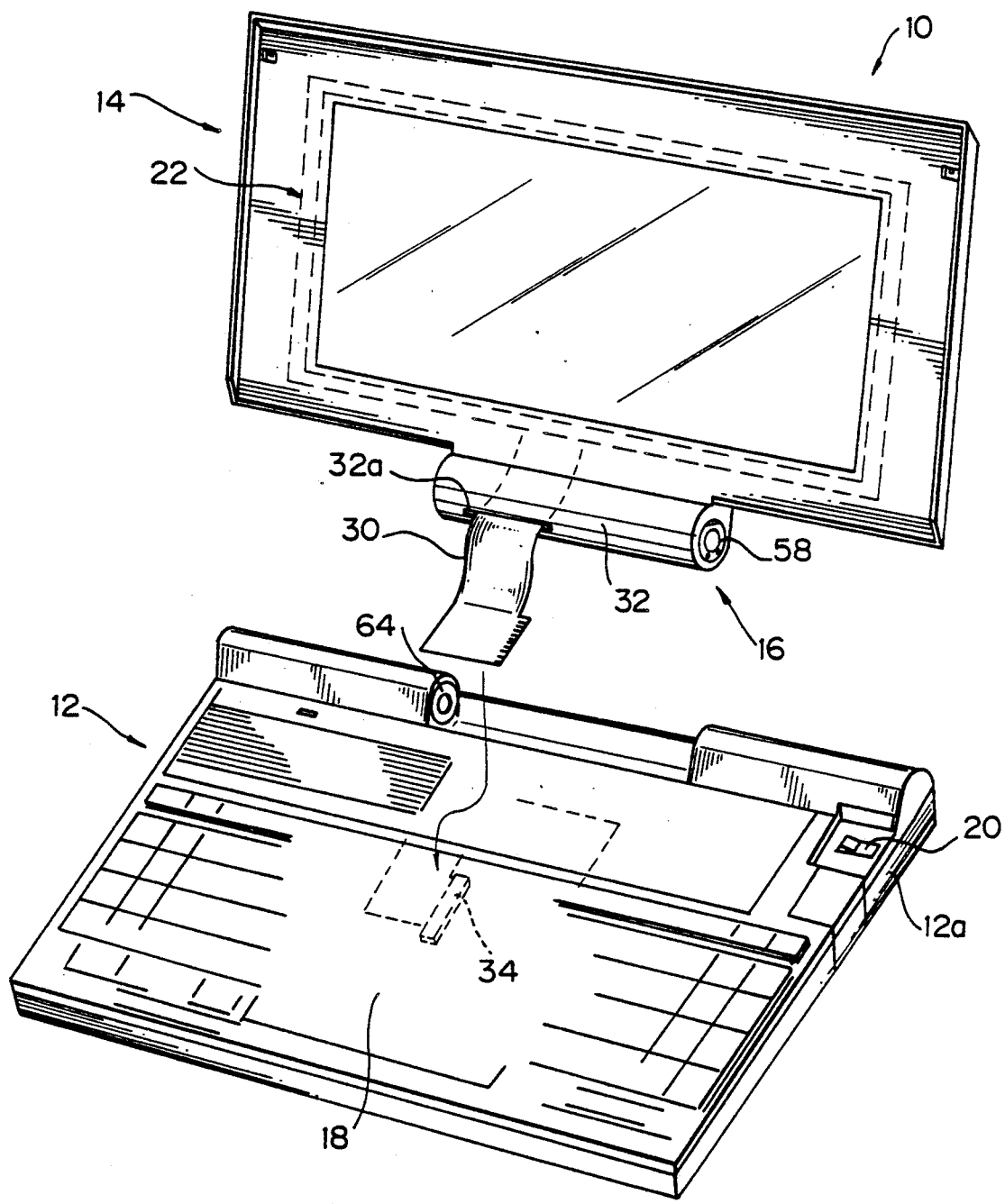
FIG. 3 is a perspective view of the computer of FIG. 1, showing the cover and a case in a disassembled position.

Referring to FIG. 1 of the drawings, a portable lap-top personal computer belonging to a family of equipment to which the present invention is applicable is shown and generally designated by the reference numeral 10. As shown, the computer 10 has a case 12 having a base 12a and accommodating a body of the computer 10 therein, and a cover 14 rotatably connected to the base 12a by a hinge assembly 16. The base 12a has a keyboard 18, a switch 20 and other manipulable components on the upper surface thereof, a connector or connectors (RS232C, DCIN, EXT, etc.) on the rear end, and a main printed circuit board, battery, DC/DC converter, and a storage such as a memory card or a floppy disk thereinside. The case 12 is implemented as a molding of resin and is plated over the entire surface thereof for shielding electromagnetic waves which will be radiated from various electronic elements built in the casing 12. While the inner periphery of the case 12 is left in the plated condition, the outer periphery is painted for the appearance reason. The plating is sometimes replaced with a coating of conductive material which contains iron powder, for example. On the other hand, the cover 14 is implemented by a molding of resin and is plated and then painted over the entire surface thereof. This plating may also be replaced with a coating of conductive material. A liquid crystal display (LCD) 22 is mounted on the cover 14 with the intermediary of an electroluminescent (EL) lamp 24. An acryl cover 26 is provided on the surface of the LCD 22 for retaining the latter. A thin sheet 28 is adhered to the surface of the acryl cover 26. As shown in FIG. 3, the hinge assembly 16 has a closing plate 32 which is formed with a through opening 32a. A flat cable 30 for connecting the LCD 22 is pulled out through the opening 32a of the closing plate 32 and anchored to a connector 34 which is disposed in the case 12.

Figure 4:
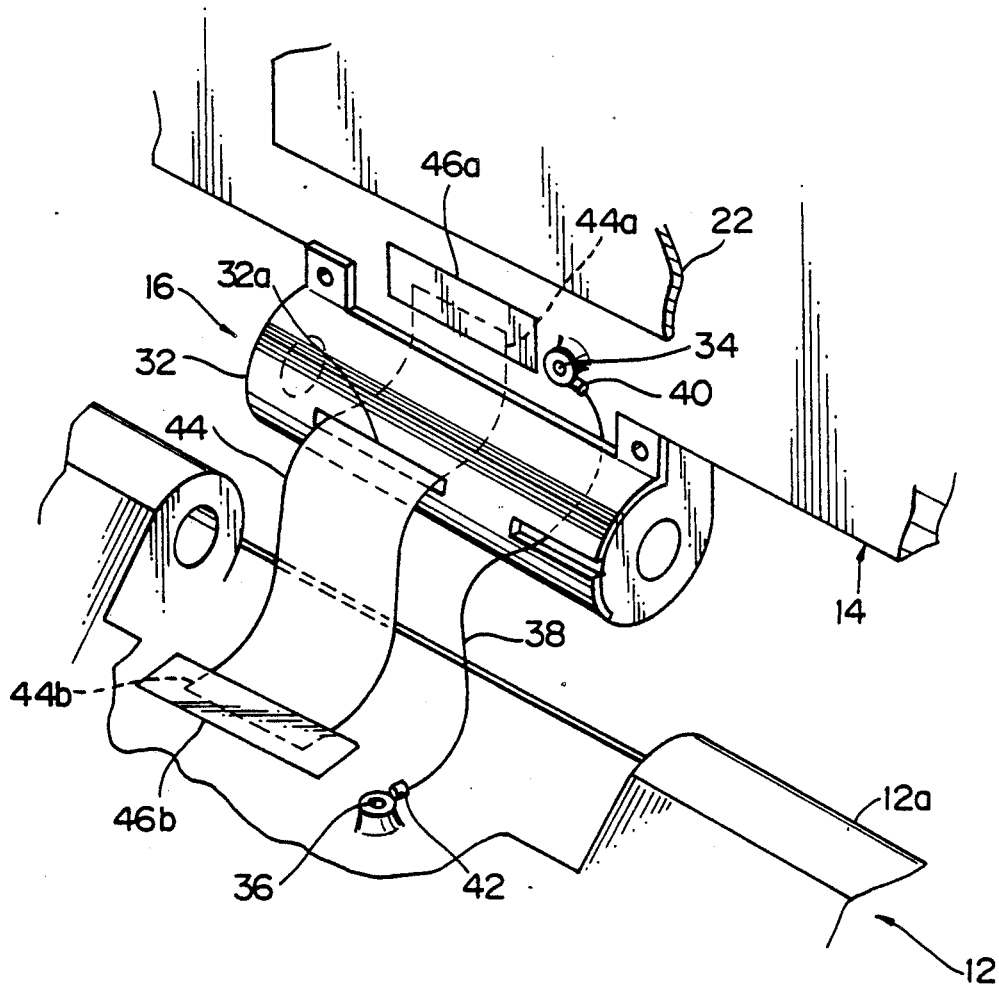
FIG. 4 is a view of a wire and a thin webbing heretofore used to electrically interconnect the case and cover of the computer, and the interconnecting structure.

The present invention provides a new and useful arrangement of the hinge assembly 16 which interconnects the cover 14 rotatably to the base 12a of the case 12. More particularly, the present invention contemplates to provide a structure which electrically interconnects the case 12 and cover 14 by the shortest possible path to thereby maintain them at the same potential. A prior art implementation for setting up such electrical connection is shown in FIG. 4. In FIG. 4, the cover 14 and the base 12a of the case have threaded holes 34 and 36, respectively, while a wire 38 has press-fitted terminals 40 and 42 at opposite ends thereof. The terminals 40 and 42 of the wire 38 are individually fixed to the threaded holes 34 and 36 by screws. Further, a thin conductive webbing 44 is passed through the opening 32a of the closing plate 32. The webbing 44 is affixed at one end to the plated surface of the cover 14 by a tape 46a which is made of copper. At the other end, the webbing 44 is affixed to the plated surface of the base 12a by a tape 46b which is also made of copper. In this configuration, since the wire 38 and webbing 44 are each connected to the base 12a and cover 14 at opposite ends thereof, they bend every time the cover 14 is rotated about the hinge assembly 16. Such a prior art scheme, therefore, has a problem as to the durability of the wire 38 and webbing 44 against bending. While the durability may be enhanced by increasing the length of the wire 38 and webbing 44, the increase in the length of the wire 38 and webbing 44 results in an increase in the length of the path for electrical connection. This is contradictory to the purport of the above arrangement, i.e., maintaining the cover 14 and case 12 at the same potential. Furthermore, the wire 38 and webbing 44 have to be affixed to the cover 14 and case 12 during the interconnection of the cover 14 and case 12 at the hinge assembly 16, obstructing efficient assembly.

Figure 5:
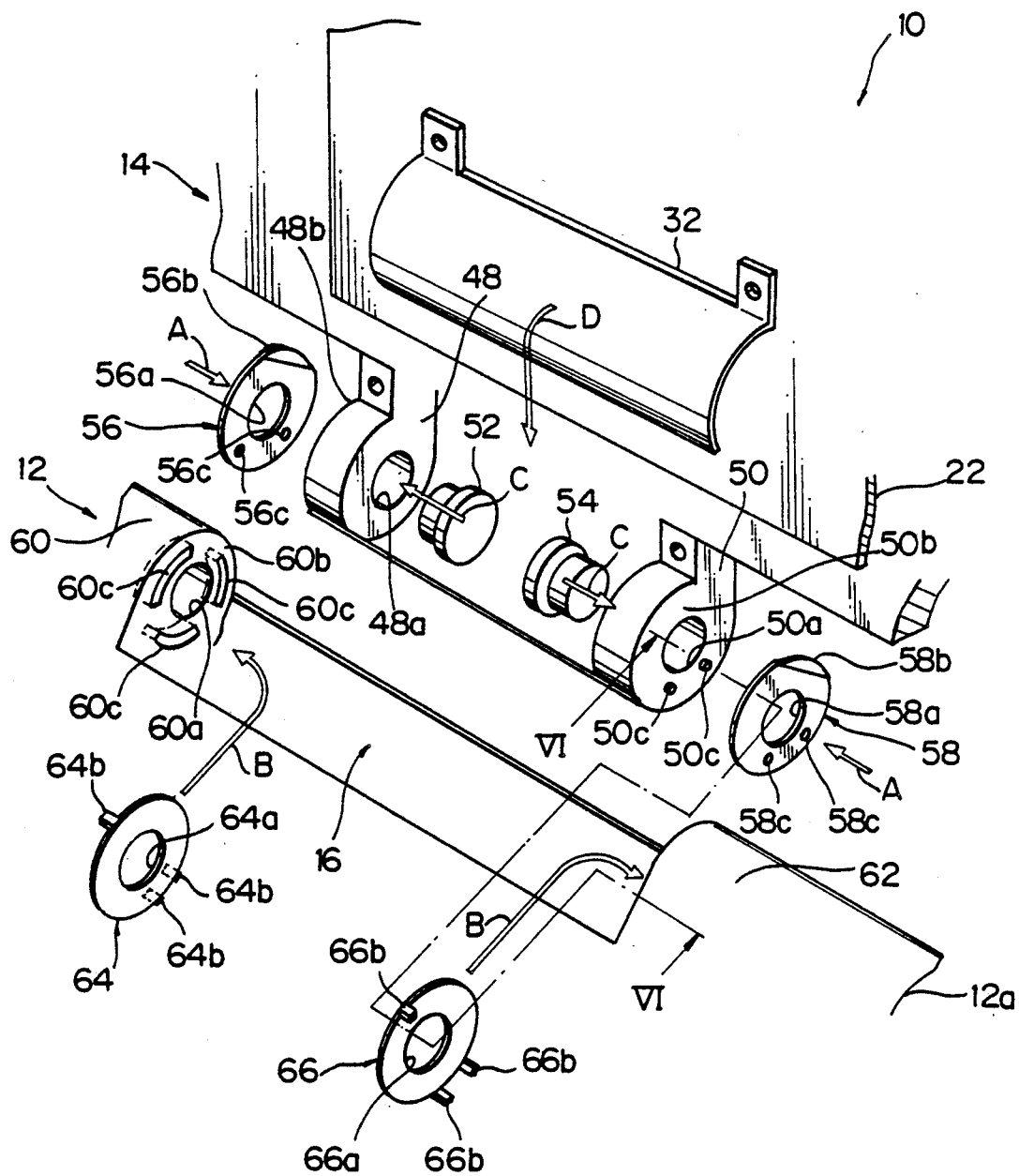
FIG. 5 is an exploded perspective view of a structure embodying the present invention.
Figure 6:
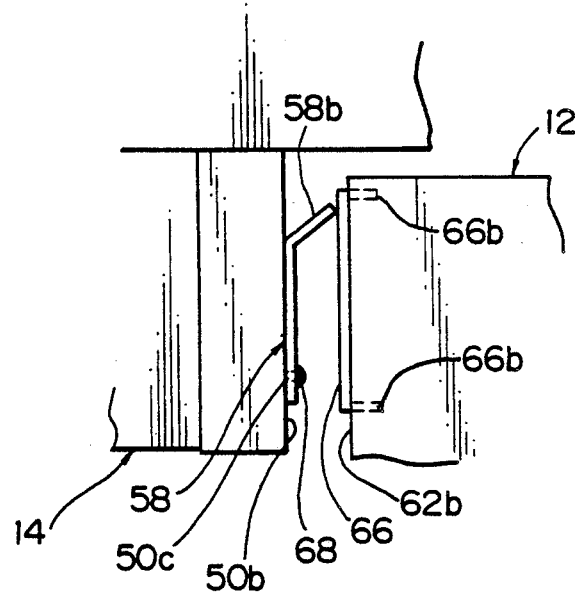
FIG. 6 is a section along line VI—VI of FIG. 5.

Referring to FIGS. 5 and 6, a preferred embodiment of the structure in accordance with the present invention is shown which interconnects the cover 14 to the base 12a of the case 12. In the figures, the same components and structural elements are designated by like reference numerals, and redundant description will be avoided for simplicity. As shown, the cover 14 has a hinge portion which includes a pair of coupling members 48 and 50. Holes 48a and 50a are respectively formed throughout the coupling members 48 and 50 at the center of the latter. Shafts 52 and 54 are received in the holes 48a and 50a, respectively, as will be described. A plurality of lugs, two lugs 48c and 50c in this embodiment (only 50c is visible), are respectively formed on the outer ends 48b and 50b of the coupling members 48 and 50. A pair of deformed O-rings 56 and 58 are fitted on the outer surfaces 48b and 50b, respectively. Specifically, the modified O-rings 56 and 58 have respectively holes 56a and 58a at the center thereof which align with the holes 48a and 50a of the coupling members 48 and 50. Further, the O-rings 56 and 58 have respectively bent portions 56b and 58b at the peripheral edges thereof. Apertures 56c and 58c are respectively formed through the O-rings 56 and 58 for receiving the lugs 48c and 50c of the coupling members 48 and 50. On the other hand, the base 12a of the case 12 has a hinge portion which includes a pair of support members 60 and 62. The coupling members 48 and 50 of the cover 14 are respectively rotatably supported by the support members 60 and 62 with the intermediary of the deformed O-rings 56 and 58. Holes 60a an 62a (only 60a is visible) are formed throughout the support members 60 and 62, respectively. A plurality of channels, three channels 60c and 62c (only 62c is visible) in this embodiment, are respectively formed in the ends 60b and 62b of the support members 60 and 62 which face each other. A pair of flat O-rings 64 and 66 are mounted on the ends 60b and 62b, respectively. The O-rings 64 and 66 have respectively holes 64a and 66a at the center thereof, and lugs 64b and 66b extending axially from the peripheral edges of the associated O-rings. The holes 64a and 66a align respectively with the holes 60a and 62a of the support members 60 and 62. The lugs 64a and 64b are slidably received in the channels 60c and 62c, respectively.

The ends 48b and 50b of the coupling members 48 and 50 and the ends 60b and 62b of the support members 60 and 62 are plated, while the other portions of the coupling members 48 and 50 and support members 60 and 62 are painted for ornamentation. Each of the deformed O-rings 56 and 58 and flat O-rings 64 and 66 is made of a conductive and resilient material.

The cover 14 is rotatably connected to the base 12a of the case 12 by the above-described connecting structure, as follows. First, the deformed O-rings 56 and 58 are so positioned as to align their apertures 56c and 58c with the lugs 48c and 50c of the coupling members 48 and 50 of the cover 14, respectively. Then, the O-rings 56 and 58 are respectively applied to the ends 48b and 50b of the coupling members 48 and 50 as indicated by an arrow A in the figure, whereby the apertures 56c and 58c are mated with the lugs 48c and 50c, respectively. In this condition, the outer ends of the O-rings 56 and 58 are fused around the apertures 56c and 58c in order to rigidly interconnect the O-rings 56 and 58 and the coupling members 48 and 50. In FIG. 6, one of the fused portions is indicated by the reference numeral 68. Subsequently, the flat O-rings 64 and 66 are respectively applied to the ends 60b and 62b of the support members 60 and 62 with their lugs 64b and 66b being inserted into the channels 60c and 62c as indicated by an arrow B. This is followed by inserting the shafts 52 and 54 into the aligned holes 48a, 56a, 64a and 60a and the aligned holes 50a, 58a, 66a and 62a, respectively, as indicated by an arrow C. Finally, the closing plate 32 is inserted as indicated by an arrow D and then fixed in place, whereby the coactive hinge portions are concealed.

In the structure shown and described, the bent portions 56b and 58b of the deformed O-rings 56 and 58 are held in slidable contact with the associated flat O-rings 64 and 66, as shown in FIG. 6. This sets up electrical connection between the case 12 and the cover 14 and thereby maintains them at the same potential. The path for such electrical connection is shorter than the conventional path which relies on a wire and a webbing as discussed previously. O-rings which are resilient promote smooth opening and closing movements of the cover 14 and, yet, enhances the reliability of electrical connection.

Figure 7A:
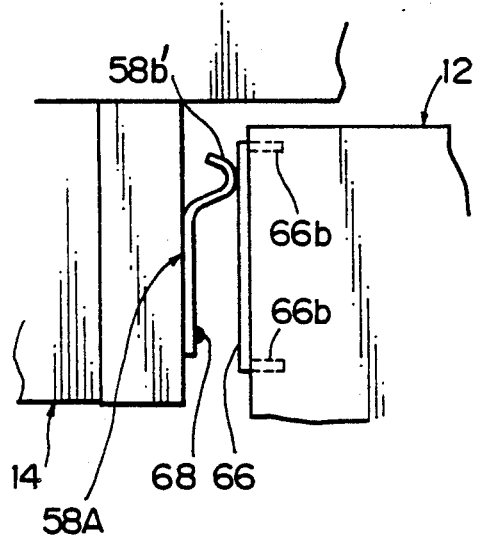
FIGS. 7A and 7B are views showing a modified form of deformed O-rings which are included in the structure of FIG. 5.
Figure 7B:
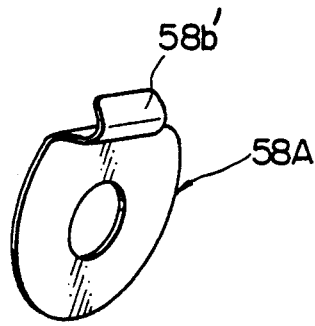

FIGS. 7A and 7B show a modified form of the modified O-rings 56 and 58. In the figures, modified O-rings 56A and 58A have respectively bent portions 56b' and 58b' each being configured in the form of a letter U. The U-shaped bent portions 56b' and 58b' are respectively held in contact with the flat O-rings 64 and 66 to set up the electrical connection.

In summary, it will be seen that the present invention provides a structure which connects a cover of a portable personal computer or word processor having a display rotatably to a case which accommodates a body of the equipment and, yet, electrically interconnects them by the shortest possible path through deformed O-rings and flat O-rings. This is successful in maintaining the case and the cover at the same potential. The electrical connection is further insured by the resiliency of the O-rings. In addition, the cover and deformed O-rings and the case and flat O-rings can be assembled independently of each other and, therefore, with efficiency.

Various modifications will become possible for those skilled in the art after receiving the teachings of the present disclosure without departing from the scope thereof.

What is claimed is:

1. A structure for connecting a rotatable body rotatably to a stationary body while maintaining an electrical connection between said rotatable body and said stationary body, said structure comprising:

a pair of coupling members constituting a hinge portion of said rotatable body and each having an engaging end, a through hole formed at the center of said engaging end, and a plurality of lugs provided in a peripheral portion of said engaging end;

a pair of deformed O-rings each having a through hole aligning with said through hole of an associated one of said coupling members at the center of said deformed O-rings, and each having a bent portion and apertures in a peripheral portion, each of said apertures mating with a respective one of said lugs;

a pair of support members constituting a hinge portion of said stationary body, each of said pair of support members having an engaging end, a through hole formed through the center of said engaging end, and a plurality of channels formed in a peripheral portion of said engaging end;

a pair of flat O-rings, a through hole at the center of each of said flat O-rings, said flat O-ring being aligning with said through hole of an associated one of said support members, and a plurality of lugs each mating with respective one of said channels of said associated support member; and a pair of shaft members each being passed through said through hole of an associated one of said coupling members, said through hole of said associated one of said deformed O-rings, said through hole of said associated one of said flat O-rings, and said through hole of said associated one of said support members, whereby each of said bent portions of said deformed O-rings mounted on said engaging ends of said support members is held in slidable contact with said peripheral portion of respective ones of said flat O-rings.

2. A structure as claimed in claim 1, wherein said engaging ends of said coupling members and said support members are plated.

3. A structure as claimed in claim 1, wherein said deformed O-rings and said flat O-rings each comprises a conductive resilient member.

4. A structure as claimed in claim 1, wherein said stationary body and said rotatable body each comprises a molding of resin.

5. A structure as claimed in claim 4, wherein said molding of resin is plated over entire surface thereof.

6. A structure as claimed in claim 4, wherein said molding of resin is painted with a conductive material to have a conductive film thereon.

7. A structure as claimed in claim 1, wherein said stationary body comprises a case of a portable computer which accommodates a body of said computer while said rotatable body comprises a cover having a display.

* * * * *